US012752865B2

(12) United States Patent
Ishii

(10) Patent No.: US 12,752,865 B2

(45) Date of Patent: Oct. 6, 2026

(54) MULTIPURPOSE VEHICLE

(71) Applicant: Kubota Corporation, Osaka (JP)

(72) Inventor: Yuji Ishii, Sakai (JP)

(73) Assignee: Kubota Corporation, Osaka (JP)

( * ) Notice: Subject to any disclaimer, the term of this patent is extended or adjusted under 35 U.S.C. 154(b) by 219 days.

(21) Appl. No.: 18/377,462

(22) Filed: Oct. 6, 2023

(65) Prior Publication Data

US 2024/0158023 A1 May 16, 2024

(30) Foreign Application Priority Data

Nov. 11, 2022 (JP) ................................ 2022-181173

(51) Int. Cl.

*B62D 33/08* (2006.01)
*B60K 5/00* (2006.01)
*B60K 13/04* (2006.01)
*B62D 33/03* (2006.01)

(52) U.S. Cl.

CPC ................ *B62D 33/08* (2013.01); *B60K 5/00* (2013.01); *B60K 13/04* (2013.01); *B62D 33/03* (2013.01); *B60K 2005/003* (2013.01)

(58) Field of Classification Search

CPC .... B62D 33/08; B62D 33/03; B62D 33/0273; B62D 33/037; B60K 5/00; B60K 13/04; B60K 2005/003

See application file for complete search history.

(56) References Cited

U.S. PATENT DOCUMENTS 5,597,195 A * 1/1997 Meek ...................... B60P 1/435 296/61
7,552,958 B2 * 6/2009 Stratten ................... E05F 5/022 49/386
7,556,305 B2 * 7/2009 Stratten .................. B62D 33/03 296/57.1
8,070,206 B2 * 12/2011 Zielinsky ........... B62D 33/0273 296/57.1

(Continued)

FOREIGN PATENT DOCUMENTS

JP H09118171 A * 5/1997
JP 4838900 B2 12/2011

(Continued)

OTHER PUBLICATIONS

Office Action in JP 2022-181173 issued Feb. 24, 2026.

*Primary Examiner* — James A Shriver, II
*Assistant Examiner* — Ian Bryce Shelton
(74) *Attorney, Agent, or Firm* — The Webb Law Firm

(57) ABSTRACT

A multipurpose vehicle includes a cargo bed including a floor panel 22 and a rear gate 24 supported to be swingable between a closed state, in which the rear gate 24 is at a vertical position with respect to the floor panel 22, and an open state, in which the rear gate 24 has swung rearward of the floor panel 22; and a holding mechanism configured to be manually operable to enter a holding state, in which the holding mechanism holds the rear gate 24 at a first angle that is a predetermined swing angle, and a holding canceled state. The cargo bed further includes a restriction mechanism 40 configured to, while the holding mechanism is in the holding canceled state, keep the rear gate 24 from swinging toward the open state by more than a second angle that is a swing angle larger than the first angle.

6 Claims, 5 Drawing Sheets

(56) References Cited

U.S. PATENT DOCUMENTS

| | | | | |
|---|---|---|---|---|
| 9,174,684 | B1 * | 11/2015 | Waskie | B62D 33/03 |
| 9,457,756 | B2 * | 10/2016 | Hirooka | B60N 2/305 |
| 9,623,803 | B1 * | 4/2017 | Martins | B60R 3/02 |
| 9,902,292 | B2 * | 2/2018 | Wakabayashi | B60N 2/68 |
| 9,956,995 | B1 * | 5/2018 | Neighbors | B62D 33/0273 |
| 10,801,237 | B2 * | 10/2020 | Hemphill | E05C 17/36 |
| 11,173,959 | B2 * | 11/2021 | Chalifour | B62D 27/00 |
| 2008/0150311 | A1 * | 6/2008 | Quigley | B62D 25/2027 296/57.1 |
| 2008/0196314 | A1 * | 8/2008 | Stratten | E05F 1/1091 49/386 |
| 2008/0197650 | A1 * | 8/2008 | Stratten | E05F 5/022 296/57.1 |
| 2008/0197652 | A1 * | 8/2008 | Stratten | B62D 33/03 49/386 |
| 2011/0181068 | A1 * | 7/2011 | Zielinsky | B62D 33/0273 296/57.1 |
| 2016/0090057 | A1 * | 3/2016 | Hirooka | B60N 2/3031 296/190.03 |
| 2017/0036717 | A1 * | 2/2017 | Wakabayashi | B60P 3/423 |
| 2017/0100994 | A1 * | 4/2017 | McAninch | B62D 33/0273 |
| 2018/0057076 | A1 | 3/2018 | Singer | |
| 2021/0129771 | A1 | 5/2021 | Martin et al. | |
| 2021/0237802 | A1 * | 8/2021 | Chalifour | B62D 27/00 |
| 2021/0300482 | A1 * | 9/2021 | Mooney | B62D 33/037 |
| 2022/0063736 | A1 * | 3/2022 | Williams | B62D 33/0273 |
| 2024/0109471 | A1 * | 4/2024 | Soncag | B60P 3/14 |
| 2024/0149774 | A1 * | 5/2024 | Kaindl | B60P 1/435 |

FOREIGN PATENT DOCUMENTS

| | | | | |
|---|---|---|---|---|
| JP | 2022107242 A | | 7/2022 | |
| WO | WO-8705249 A1 | * | 9/1987 | B62D 33/03 |

* cited by examiner

MULTIPURPOSE VEHICLE

CROSS-REFERENCE TO RELATED APPLICATION

This application claims priority to Japanese Patent Application No. 2022-181173 filed Nov. 11, 2022, the disclosure of which is hereby incorporated by reference in its entirety.

BACKGROUND OF THE INVENTION

1. Field of the Invention

The present invention relates to a multipurpose vehicle that includes a cargo bed.

2. Description of Related Art

As described in Patent Document 1 (JP 2022-107242A), conventional multipurpose vehicles include a rear gate (a "tailgate" in the document) of a cargo bed configured to be swingable in order to make it easy to load cargo on the cargo bed and unload cargo from the cargo bed.

Also, in the multipurpose vehicle described in Patent Document 1, the rear gate is held horizontally with use of a holding mechanism (a "horizontally-holding mechanism" in the document) that includes a wire and the like.

However, the wire included in the holding mechanism of the multipurpose vehicle described in Patent Document 1 is configured to be removable. When the wire is removed, the rear gate can further swing from the horizontal state.

In common multipurpose vehicles, an engine and an exhaust muffler for the engine are under the cargo bed as described in Patent Document 1, and the rear gate from which the wire of the holding mechanism has been removed comes near the exhaust muffler. Also, when the rear gate from which the wire of the holding mechanism has been removed swings with great force, the rear gate may come into contact with the exhaust muffler with great force.

When the rear gate comes into contact with the exhaust muffler, there is a problem that the rear gate deforms due to the high temperature of the exhaust muffler. Also, the exhaust muffler or the rear gate may be broken as a result of the rear gate coming into contact with the exhaust muffler with great force.

SUMMARY OF THE INVENTION

An object of the present invention is to provide a multipurpose vehicle that can prevent a rear gate and a device such as an exhaust muffler under a cargo bed from coming close to each other and coming into contact with each other.

A multipurpose vehicle according to the present invention includes: a cargo bed including a floor panel and a rear gate that is supported in such a manner as to be swingable between a closed state, in which the rear gate is at a vertical position with respect to the floor panel, and an open state, in which the rear gate has swung rearward of the floor panel; and a holding mechanism configured to be manually operable to enter a holding state, in which the holding mechanism holds the rear gate at a first angle that is a predetermined swing angle, and a holding canceled state, wherein the cargo bed further includes a restriction mechanism configured to, while the holding mechanism is in the holding canceled state, keep the rear gate from swinging toward the open state by more than a second angle that is a swing angle larger than the first angle.

According to the present invention, the restriction mechanism keeps the rear gate from swinging toward the open state by more than the second angle even when the holding mechanism is in the holding canceled state. Therefore, the rear gate can be prevented from coming near devices provided above or under the cargo bed and coming into contact therewith.

Moreover, the second angle is a swing angle larger than the first angle, and the rear gate does not swing by the second angle when held by the holding mechanism. That is, the angle of the rear gate differs between a case where the rear gate is held by the holding mechanism and a case where the rear gate is restricted by the restriction mechanism. This configuration enables a worker to determine whether the rear gate is held by the holding mechanism or restricted by the restriction mechanism.

In the present invention, it is preferable that the restriction mechanism includes: a first abutting portion provided in the rear gate; and a second abutting portion provided in a rear portion of the cargo bed and configured to abut against the first abutting portion when a swing angle of the rear gate is the second angle.

In this case, the restriction mechanism can be realized with the simple configuration in which the first abutting portion provided in the rear gate abuts against the second abutting portion provided in the rear portion of the cargo bed.

In the present invention, it is preferable that the rear gate swings about a swing shaft extending in a left-right direction and provided in a lower rear portion of the cargo bed.

According to this configuration, the restriction mechanism restricts downward swinging of the rear gate whose free end side swings toward the underside of the cargo bed in the open state. When the rear gate swings downward, the rear gate swings with great force under the action of gravity, but the restriction mechanism can prevent the rear gate from swinging with great force.

In the present invention, it is preferable that the multipurpose vehicle further includes an exhaust muffler provided under the cargo bed and including an exhaust port at a position corresponding to a rear portion of the cargo bed, and the rear gate is behind the exhaust port when a swing angle of the rear gate is the second angle.

According to this configuration, the rear gate is behind the exhaust muffler when the swing angle of the rear gate is the second angle. That is, as a result of the rear gate being restricted by the restriction mechanism, the rear gate can be prevented from coming near the exhaust muffler and coming into contact therewith.

In the present invention, it is preferable that the cargo bed is configured to be swingable in an up-down direction between a horizontal position and an inclined position, and the rear gate is behind the exhaust port when the cargo bed is at the inclined position.

According to this configuration, even if the cargo bed is at the inclined position, the rear gate is behind the exhaust muffler when the swing angle of the rear gate is the second angle. That is, this configuration makes it possible to prevent the rear gate from coming near the exhaust muffler and coming into contact therewith even when the cargo bed is at the inclined position.

In the present invention, it is preferable that the multipurpose vehicle further includes an engine under the cargo bed, and the rear gate is behind the engine when a swing angle of the rear gate is the second angle.

According to this configuration, the rear gate is behind the engine when the swing angle of the rear gate is the second angle. That is, as a result of the rear gate being restricted by the restriction mechanism, the rear gate can be prevented from coming near the engine and coming into contact therewith.

In the present invention, it is preferable that the cargo bed is configured to be swingable in an up-down direction between a horizontal position and an inclined position, and the rear gate is behind the engine when the cargo bed is at the inclined position.

According to this configuration, even if the cargo bed is at the inclined position, the rear gate is behind the engine when the swing angle of the rear gate is the second angle. That is, this configuration makes it possible to prevent the rear gate from coming near the engine and coming into contact therewith even when the cargo bed is at the inclined position.

DESCRIPTION OF THE INVENTION

Figure 1:
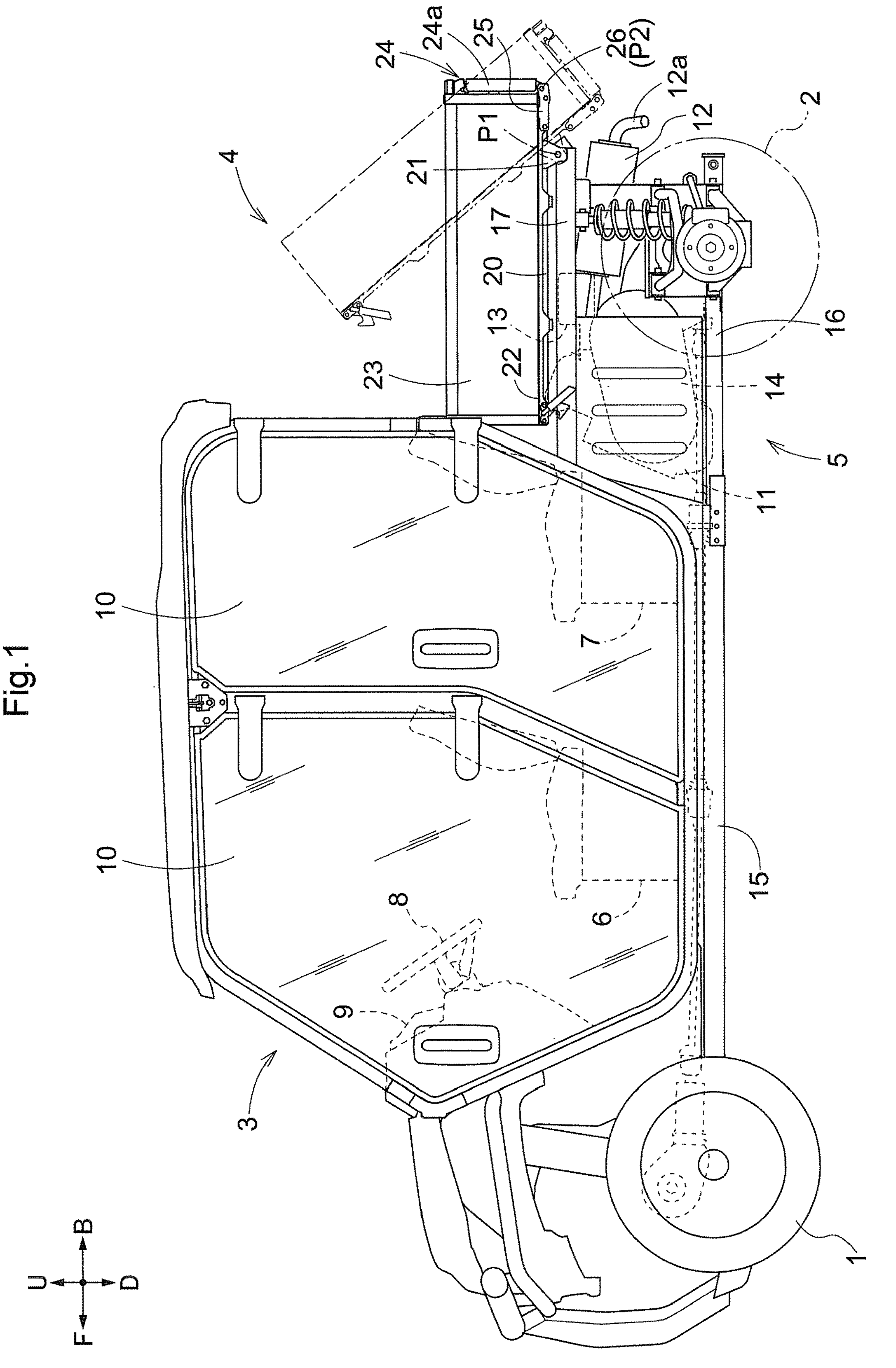
FIG. 1 is a side view showing the entirety of a multipurpose vehicle.

The following describes an embodiment of the present invention based on the drawings. In the following description, the direction of an arrow F shown in the drawings will be referred to as the "front side", the direction of an arrow B shown in the drawings will be referred to as the "rear side", the direction of an arrow L shown in the drawings will be referred to as the "left side", and the direction of an arrow R shown in the drawings will be referred to as the "right side" unless otherwise specified. Also, the direction of an arrow U shown in the drawings will be referred to as the "upper side", and the direction of an arrow D shown in the drawings will be referred to as the "lower side"

[Overall Configuration]

FIG. 1 shows a multipurpose vehicle. As shown in FIG. 1, the multipurpose vehicle includes left and right front wheels 1 that can be steered and driven, left and right rear wheels 2 that can be driven, a boarding section 3 that can accommodate an operator and the like, a cargo bed 4 on which cargo can be loaded, and a prime mover unit 5 under the cargo bed 4, for example.

A front seat 6 including a driver seat on which an operator sits is provided on the front side within the boarding section 3, and a rear seat 7 is provided on the rear side within the boarding section 3. Furthermore, a steering wheel 8 for performing steering operations and the like are provided in the boarding section 3. The steering wheel 8 is disposed on a driving panel 9 in front of the front seat 6.

Doors 10 configured to be openable and closable are provided on lateral sides of the boarding section 3. The doors 10 are disposed on lateral sides of the front seat 6 in the vehicle body left-right direction and lateral sides of the rear seat 7 in the vehicle body left-right direction.

The prime mover unit 5 includes an engine 11, an exhaust muffler 12 for the engine, a transmission case 13 behind the engine 11, a continuously variable transmission 14 that is on the left side of the engine 11 and the transmission case 13 and transmits power from the engine 11 to the transmission case 13, an air supply device (not shown) that supplies air for combustion to the engine 11, and an exhaust device (not shown) for processing exhaust gas emitted from the engine 11, for example.

The exhaust muffler 12 extends rearward and includes an exhaust port 12*a* at a position corresponding to a rear portion of the cargo bed 4.

The continuously variable transmission 14 is surrounded by a case and includes a belt-type continuously variable transmission mechanism (not shown) inside the case. The continuously variable transmission 14 is coupled to and supported by lateral side portions of the engine 11 and the transmission case 13. The transmission case 13 is coupled to and supported by a rear portion side of the engine 11.

The multipurpose vehicle includes a main frame 15 that supports a front portion and an intermediate portion of the multipurpose vehicle and a rear frame 16 that supports the prime mover unit 5. Although a detailed description is omitted, the rear frame 16 supports the left and right rear wheels 2 via a rear suspension, and the main frame 15 supports the left and right front wheels 1 via a front suspension (not shown).

A cargo bed support frame 17 supported by the rear frame 16 is provided under the cargo bed 4. The cargo bed 4 is supported by the cargo bed support frame 17.

Driving force output from the engine 11 is transmitted to the transmission case 13 after being subjected to speed changing in a stepless manner by the continuously variable transmission 14. A gear transmission mechanism (not shown) provided inside the transmission case 13 enables the vehicle to enter a forward traveling state, a backward traveling state, and a neutral state. The driving force output from the transmission case 13 is transmitted to the left and right front wheels 1 and the left and right rear wheels 2.

[Cargo Bed]

The cargo bed 4 includes a beam structure 20 supporting the cargo bed 4 from below. The beam structure 20 includes a plurality of longitudinally-extending members T extending in the front-rear direction of the multipurpose vehicle (see FIG. 4) and a plurality of laterally-extending members Y extending in the lateral direction of the multipurpose vehicle (see FIG. 4). The longitudinally-extending members T and the laterally-extending members Y constituting the beam structure 20 are joined to each other by being welded, for example, and thus the beam structure 20 is formed as a strong structure.

Figure 3:
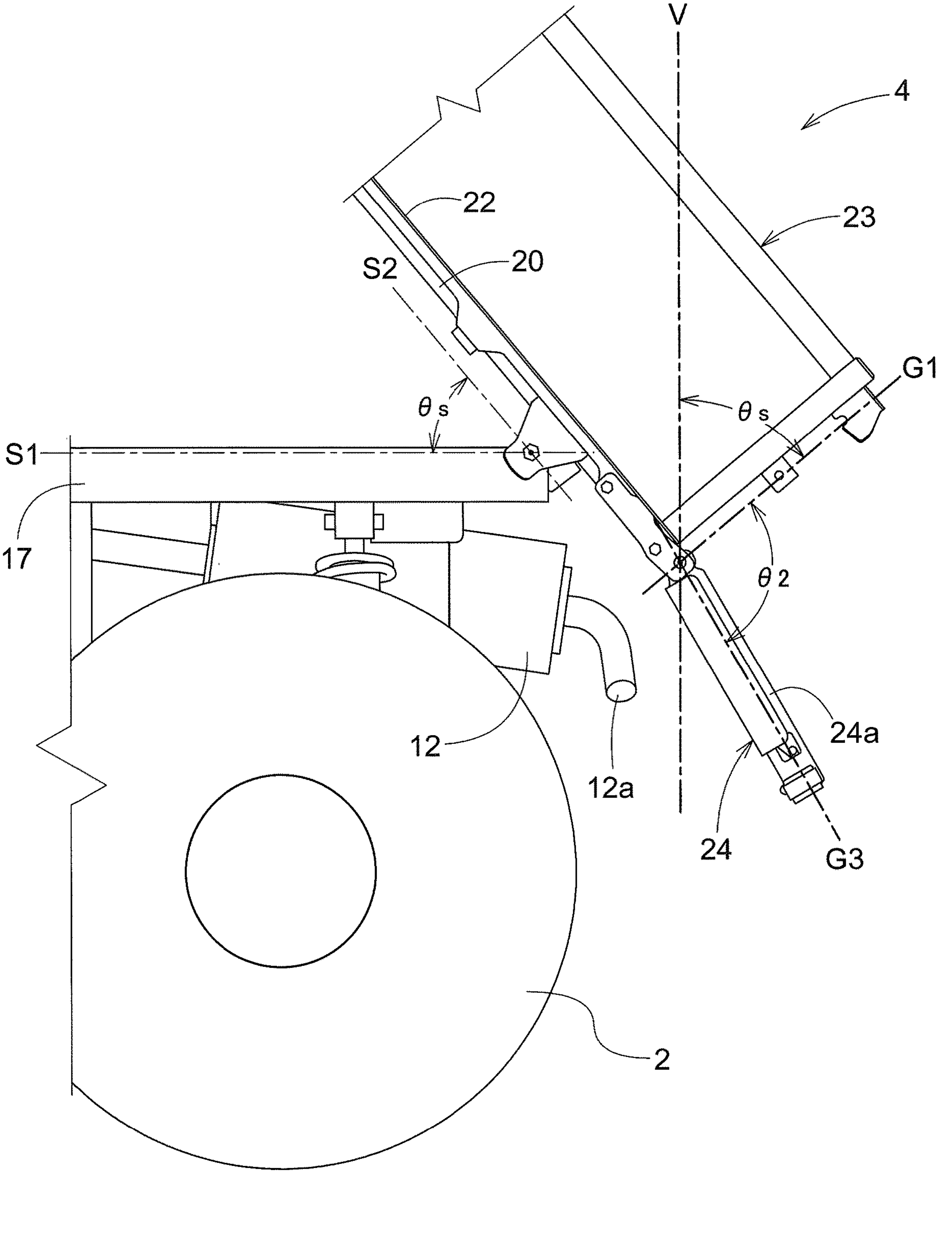
FIG. 3 is a side view showing the configuration of the cargo bed at an inclined position.

A bracket 21 provided in a rear portion of the beam structure 20 is supported in such a manner as to be swingable about an axis P1 extending in the left-right direction of the cargo bed support frame 17. Accordingly, the cargo bed 4 is swingable about the axis P1 between a horizontal position S1 and an inclined position S2 in the up-down direction as shown in FIG. 3. In the present embodiment, an inclination angle θs of the cargo bed 4 at the inclined position S2 relative to the cargo bed 4 at the horizontal position S1 is set to about 50°.

As shown in FIG. 1, the cargo bed 4 has a box shape constituted by a floor panel 22 including a cargo loading surface on which cargo is placed, left and right side covers 23 standing from a left end portion and a right end portion of the floor panel 22, a front plate standing from a front end portion of the floor panel 22, and a rear gate 24 standing from a rear end portion of the floor panel 22.

Figure 2:
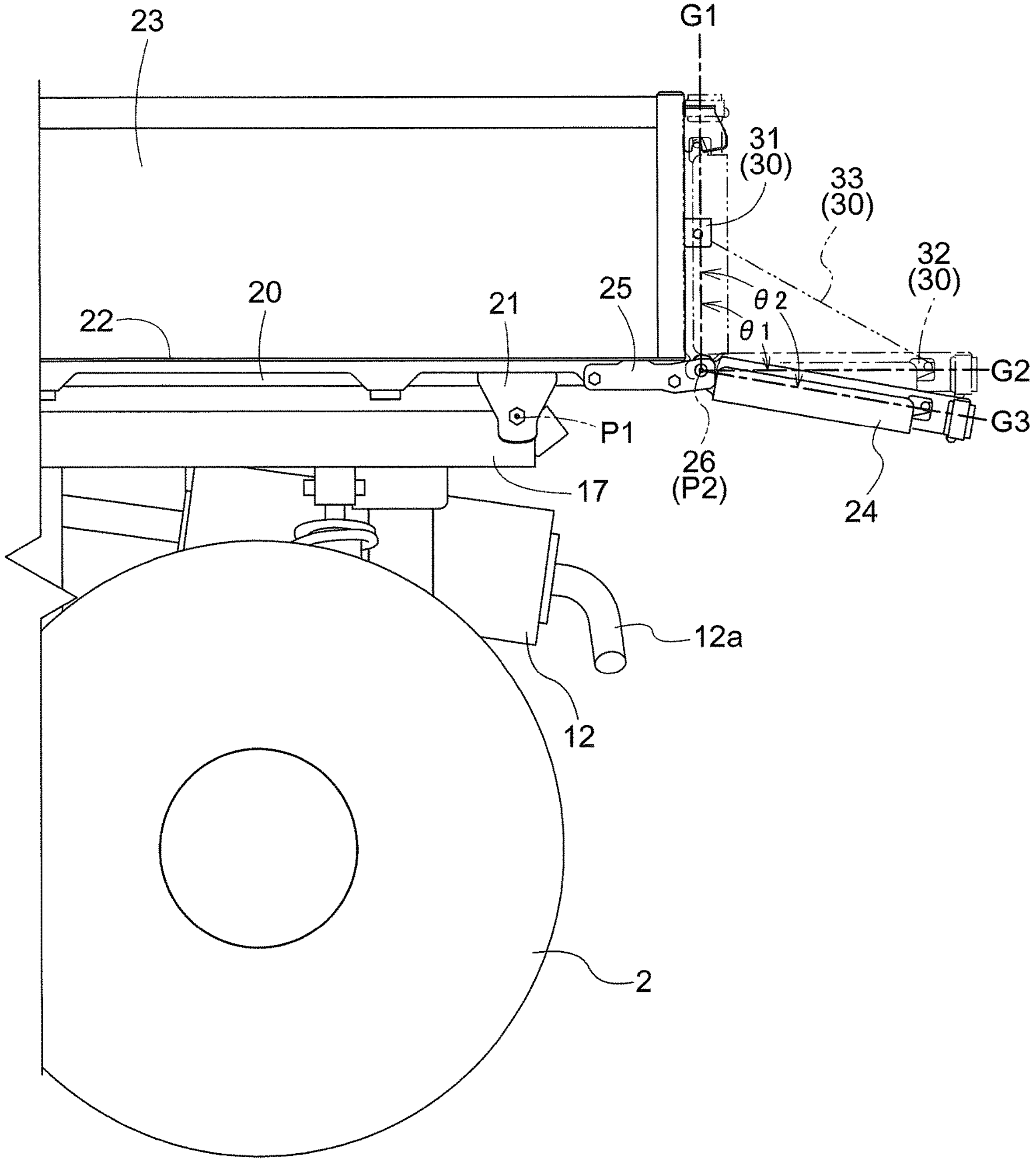
FIG. 2 is a side view showing the configuration of a cargo bed at a horizontal position.

As shown in FIG. 2, the rear gate 24 is supported in such a manner as to be swingable between a closed state in which the rear gate 24 is at a vertical position G1 with respect to the floor panel 22 and an open state in which the rear gate 24 has swung rearward of the floor panel 22. The rear gate 24 is supported in the swingable manner by left and right gate brackets 25, which are respectively fixed to left and right rear ends of the beam structure 20, via a swing shaft 26.

The swing shaft 26 is fixed to lower end regions of left and right edge members 24*a* that are respectively provided at left and right edge portions of the rear gate 24 and extend in the up-down direction when the rear gate 24 is at the vertical position G1. Although a detailed description is omitted, the left and right edge members 24*a* have substantially C-shaped cross sections including surfaces on the inner side and the outer side in the left-right direction, and the swing shaft 26 is fixed to inner surfaces of the left and right edge members 24*a*. With this configuration, the swing shaft 26 provided in a lower rear portion of the cargo bed 4 serves as an axis P2 extending in the left-right direction and the rear gate 24 is configured to be swingable about the axis P2.

As shown in FIG. 2, the rear gate 24 is held by a holding mechanism 30 at a held position G2 when the rear gate 24 has swung rearward by a first angle θ1, which is a predetermined swing angle, with respect to the vertical position G1. In the present embodiment, an angle between the cargo bed 4 at the vertical position G1 and the cargo bed 4 at the held position G2, i.e., the first angle θ1 is about 90°.

The holding mechanism 30 includes first metal fittings 31 respectively provided at rear ends of the left and right side covers 23, second metal fittings 32 respectively provided at left and right ends of the rear gate 24, and holding wires 33 attached to the first metal fittings 31 at one end side thereof and attached to the second metal fittings 32 at the other end side thereof.

In the present embodiment, the holding wires 33 are fixed to the first metal fittings 31 and locked to the second metal fittings 32 in a removable manner. With this configuration, the holding mechanism 30 can be manually operated to enter a holding state in which the holding wires 33 are locked to the second metal fittings 32 and hold the rear gate 24 at the first angle θ1, which is the predetermined swing angle, and a holding canceled state in which the holding wires 33 have been removed from the second metal fittings 32. Note that the present invention is not limited to this configuration, and a configuration is also possible in which the holding wires 33 are fixed to the second metal fittings 32 and locked to the first metal fittings 31 in a removable manner. Alternatively, a configuration is also possible in which the holding wires 33 are locked to the first metal fittings 31 and the second metal fittings 32 in a removable manner.

[Restriction Mechanism]

Figure 4:
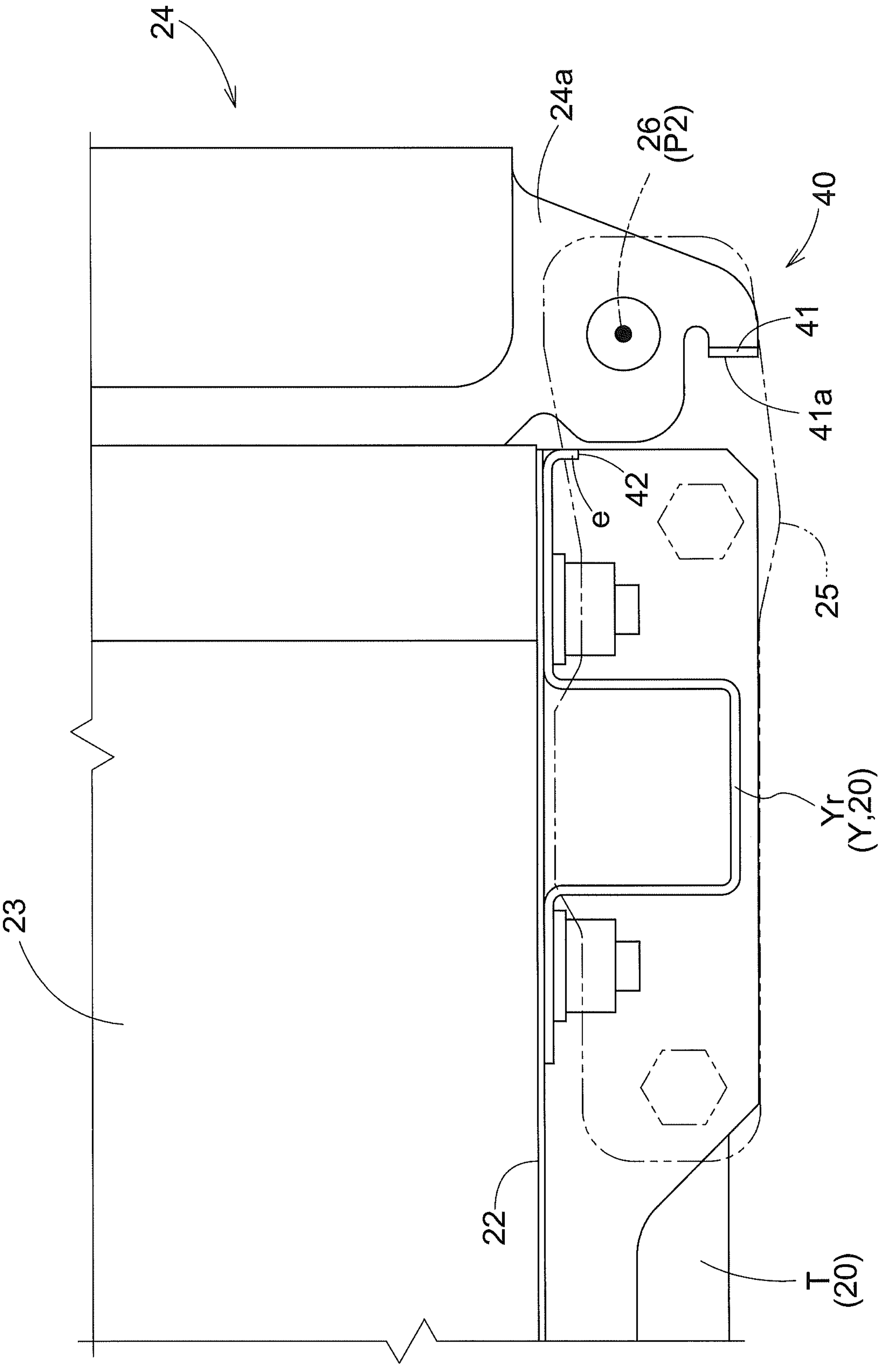
FIG. 4 is a diagram showing the configuration of a restriction mechanism when a rear gate is at a vertical position.
Figure 5:
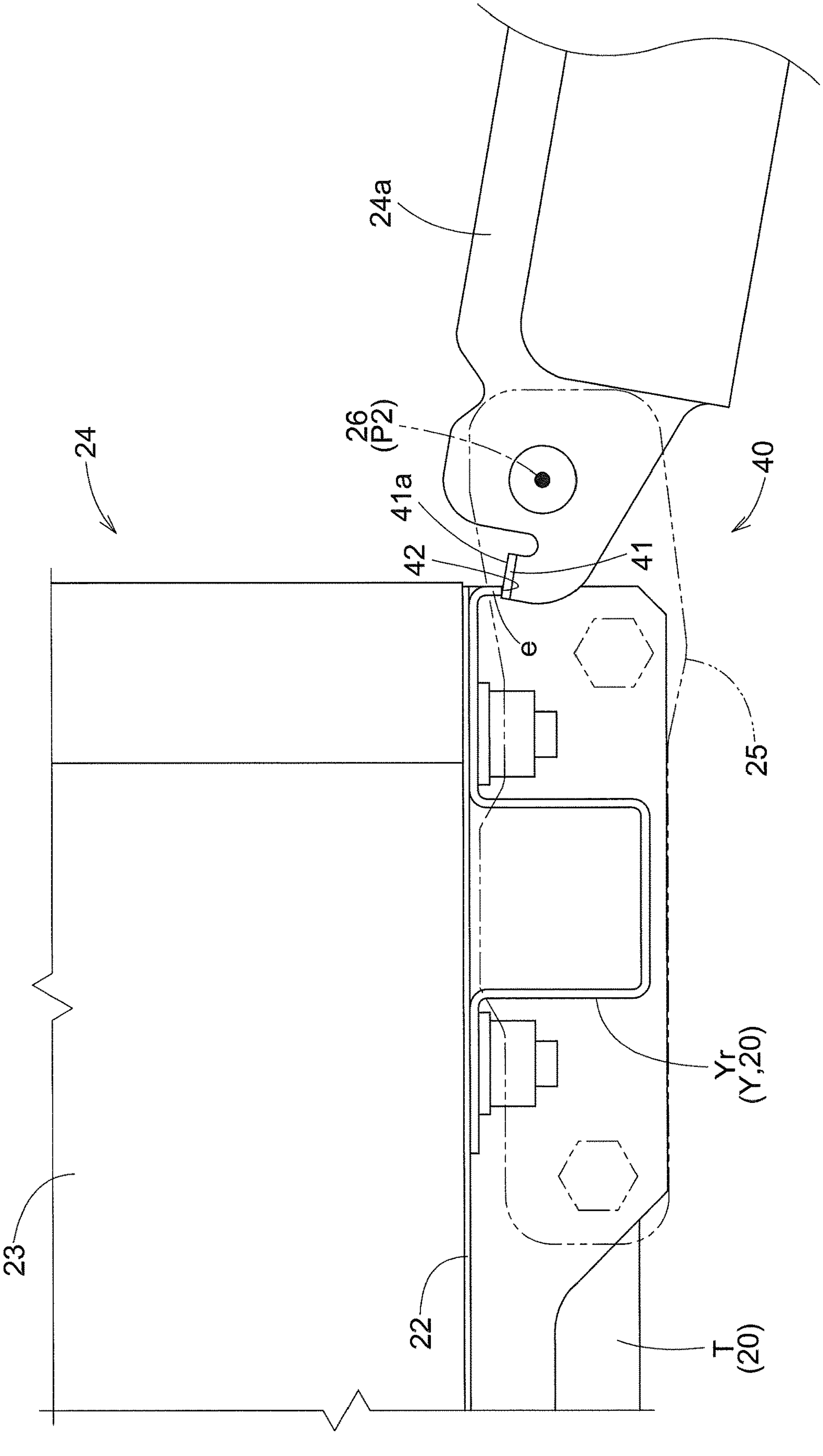
FIG. 5 is a diagram showing the configuration of the restriction mechanism when a first abutting portion and a second abutting portion abut on each other.

As shown in FIGS. 4 and 5, the cargo bed 4 includes a restriction mechanism 40 that keeps the rear gate 24 from swinging toward the open state by more than a second angle θ2 (see FIG. 2) that is a swing angle larger than the first angle θ1 (see FIG. 2). Here, the position of the rear gate 24 when the rear gate 24 is kept from swinging by the restriction mechanism 40 will be referred to as a "restricted position G3". In the present embodiment, the second angle θ2, i.e., an angle between the rear gate 24 at the vertical position G1 and the rear gate 24 at the restricted position G3 is about 95°. Note that FIG. 2 shows the second angle θ2 as an angle larger than 95° for the sake of convenience of description.

In the present embodiment, the restriction mechanism 40 includes first abutting portions 41 respectively provided in the left and right edge members 24*a* of the rear gate 24 and left and right second abutting portions 42 provided in the beam structure 20. FIGS. 4 and 5 show the left edge member 24*a* and the left second abutting portion 42 out of the left and right edge members 24*a* and the left and right second abutting portions 42. The right edge member 24*a* and the right second abutting portion 42 have configurations similar to those of the left edge member 24*a* and the left second abutting portion 42.

The two first abutting portions 41 are formed at the lower left end and the lower right end of the rear gate 24 at the vertical position G1. Specifically, as shown in FIGS. 4 and 5, the first abutting portions 41 are formed at lower ends of the inner surfaces of the left and right edge members 24*a* having the substantially C-shaped cross sections including surfaces on the inner side and the outer side in the left-right direction.

In the left and right edge members 24*a* of the rear gate 24, the left and right first abutting portions 41 are formed at the lower ends of the edge members 24*a* on the side opposite to free ends of the edge members 24*a* with respect to the swing shaft 26 at the vertical position G1. The left and right first abutting portions 41 include abutting portions 41*a* that extend in the up-down direction when the rear gate 24 is at the vertical position G1. When the rear gate 24 swings from the vertical position G1, the held position G2, or the like toward the restricted position G3, the abutting portions 41*a* move toward a rear end portion of the beam structure 20 of the cargo bed 4.

A rear laterally-extending member Yr that is the rearmost member of the plurality of laterally-extending members Y constituting the beam structure 20 of the cargo bed 4 is next to the lower portion of the rear gate 24 in the front-rear direction. That is, the rear laterally-extending member Yr is the closest to the rear gate 24 out of the plurality of laterally-extending members Y.

The rear laterally-extending member Yr includes vertical portions e in its rear end portion. The vertical portions e are formed by bending rear portions of the rear laterally-extending member Yr, which is constituted by a metal plate. When the rear gate 24 swings from the vertical position G1, the held position G2, or the like toward the restricted position G3, the abutting portions 41*a* move toward the vertical portions e.

The rear gate 24 is configured to be swingable in such a manner that the swing angle with respect to the vertical position G1 becomes larger than the first angle θ1 in the holding canceled state in which the holding wires 33 have been removed from the second metal fittings 32 of the rear gate 24. When the rear gate 24 swings from the vertical position G1, the held position G2, or the like toward the restricted position G3 and the swing angle with respect to the vertical position G1 reaches the second angle θ2, the first abutting portions 41 abut against lower end portions of the vertical portions e. That is, the lower end portions of the vertical portions e are configured as the second abutting portions 42 against which the first abutting portions 41 abut. With this configuration, the restriction mechanism 40 keeps the rear gate 24 from swinging toward the open state by more than the second angle θ2, which is a swing angle larger than the first angle θ1, with respect to the vertical position G1 in the holding canceled state in which the holding wires 33 have been removed from the second metal fittings 32 of the rear gate 24.

As shown in FIG. 3, in the present embodiment, the inclination angle θs of the cargo bed 4 at the inclined position S2 relative to the cargo bed 4 at the horizontal position S1 is set to about 50°, and accordingly, an angle of the rear gate 24 at the restricted position G3 relative to a vertical direction V that is vertical to the ground is about 145° (θs+θ2).

When the swing angle of the rear gate 24 is the second angle θ2, the rear gate 24 is behind the engine 11 and the exhaust port 12*a* of the exhaust muffler 12. Even when the cargo bed 4 is at the inclined position S2 and the swing angle of the rear gate 24 is the second angle θ2, the rear gate 24 is behind the engine 11 and the exhaust port 12*a* of the exhaust muffler 12.

That is, in both of the case where the cargo bed 4 is at the horizontal position S1 and the case where the cargo bed 4 is at the inclined position S2, the rear gate 24 is spaced apart from the engine 11 and the exhaust port 12*a* of the exhaust muffler 12 having high temperatures, when the swing angle of the rear gate 24 is the second angle θ2. With this configuration, the rear gate 24 is kept from coming near the engine 11 and the exhaust port 12*a* of the exhaust muffler 12 and coming into contact therewith. Consequently, the rear gate 24 can be kept from breaking or deforming by coming near the engine 11 and the exhaust muffler 12 and coming into contact therewith.

OTHER EMBODIMENTS

The following describes examples of other embodiments in which the above embodiment is modified.

(1) In the above embodiment, a configuration is described as an example in which the first angle θ1 is about 90° and the second angle θ2 is about 95°, but the present invention is not limited to the above embodiment, and another combination of angles may be adopted for the first angle θ1 and the second angle θ2 as long as the second angle θ2 is larger than the first angle θ1.

(2) In the above embodiment, a configuration is described as an example in which the restriction mechanism 40 keeps the rear gate 24 from swinging toward the open state by more than the second angle θ2, but the present invention is not limited to the above embodiment, and a configuration is also possible in which the left and right side covers 23 are configured to be swingable and kept from swinging toward an open state by more than the second angle θ2, for example.

In this case, the left and right side covers 23 may be configured to be positioned outward of the engine 11 and the exhaust port 12*a* of the exhaust muffler 12 when the swing angle of the left and right side covers 23 is the second angle θ2.

(3) In the above embodiment, a configuration is described as an example in which the restriction mechanism 40 includes the first abutting portions 41 and the second abutting portions 42 configured to abut against the first abutting portions 41, but the present invention is not limited to the above embodiment, and the restriction mechanism 40 may be constituted by a plate-shaped member that extends rearward from a rear end portion of the floor panel 22 and abuts against a rear surface of the rear gate 24 when the swing angle of the rear gate 24 is the second angle θ2, for example.

(4) In the above embodiment, a configuration is described as an example in which the swing shaft 26 is fixed to the left and right lower end regions of the rear gate 24, but the present invention is not limited to the above embodiment, and a configuration is also possible in which the swing shaft 26 is fixed to left and right upper end regions of the rear gate 24 and the rear gate 24 swings upward.

(5) In the above embodiment, a configuration is described as an example in which the doors 10 configured to be openable and closable are provided on lateral sides of the boarding section 3, but the present invention is not limited to the above embodiment, and a configuration is also possible in which the doors 10 are not provided.

(6) In the above embodiment, a configuration is described as an example in which the front seat 6 and the rear seat 7 are provided in the boarding section 3, but the present invention is not limited to the above embodiment, and a configuration is also possible in which only the front seat 6 is provided in the boarding section 3.

Note that the configurations disclosed in the above embodiments (including the other embodiments, the same applies hereinafter) can be applied in combination with configurations disclosed in other embodiments as long as no contradiction arises. The embodiments disclosed in the present specification are examples. Embodiments of the present invention are not limited to the disclosed embodiments, and can be modified as appropriate within a scope not departing from the object of the present invention.

INDUSTRIAL APPLICABILITY

The present invention can be applied to a multipurpose vehicle that is used for movement of people, transportation of goods, recreations, and the like.

LIST OF REFERENCE SIGNS

4 Cargo bed
11 Engine
12 Exhaust muffler
12*a* Exhaust port
22 Floor panel
24 Rear gate
26 Swing shaft
30 Holding mechanism
40 Restriction mechanism
41 First abutting portion
42 Second abutting portion
G1 Vertical position
P2 Axis
S1 Horizontal position
S2 Inclined position
θ1 First angle
θ2 Second angle

What is claimed is:

1. A multipurpose vehicle comprising:

a cargo bed comprising a floor panel and a rear gate that is supported in such a manner as to be swingable between a closed state, in which the rear gate is at a vertical position with respect to the floor panel, and an open state, in which the rear gate has swung rearward of the floor panel; and a holding mechanism configured to be manually operable to enter a holding state, in which the holding mechanism holds the rear gate at a first angle that is a predetermined swing angle, and a holding canceled state, and wherein the cargo bed further comprises a restriction mechanism configured to, while the holding mechanism is in the holding canceled state, keep the rear gate from swinging toward the open state by more than a second angle that is a swing angle larger than the first angle, such that at the second angle the rear gate extends rearward and downward beyond the floor panel of the cargo bed, wherein the restriction mechanism comprises:

a first abutting portion provided in the rear gate; and a second abutting portion provided in a rear portion of the cargo bed and configured to abut against the first abutting portion when a swing angle of the rear gate is the second angle, and wherein the cargo bed further comprises a beam structure configured to support the cargo bed from below, and the second abutting portion is integral with the beam structure.

2. The multipurpose vehicle according to claim 1, wherein the rear gate swings about a swing shaft extending in a left-right direction and provided in a lower rear portion of the cargo bed.

3. The multipurpose vehicle according to claim 2, further comprising:

an exhaust muffler provided under the cargo bed and comprising an exhaust port at a position corresponding to a rear portion of the cargo bed, and wherein the rear gate is behind the exhaust port when a swing angle of the rear gate is the second angle.

4. The multipurpose vehicle according to claim 3, wherein the cargo bed is configured to be swingable in an up-down direction between a horizontal position and an inclined position, and the rear gate is behind the exhaust port when the cargo bed is at the inclined position.

5. The multipurpose vehicle according to claim 2, further comprising:

an engine under the cargo bed, and wherein the rear gate is behind the engine when a swing angle of the rear gate is the second angle.

6. The multipurpose vehicle according to claim 5, wherein the cargo bed is configured to be swingable in an up-down direction between a horizontal position and an inclined position, and wherein the rear gate is behind the engine when the cargo bed is at the inclined position.

* * * * *